US008744278B2

(12) United States Patent
Oda et al.

(10) Patent No.: US 8,744,278 B2
(45) Date of Patent: Jun. 3, 2014

(54) METHOD FOR ELECTRIC POWER SUPPLY OF OPTICAL RECEIVER, DIGITAL SIGNAL PROCESSING CIRCUIT, AND OPTICAL RECEIVER

(75) Inventors: Shoichiro Oda, Kawasaki (JP); Takeshi Hoshida, Kawasaki (JP); Hisao Nakashima, Kawasaki (JP); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 940 days.

(21) Appl. No.: 12/458,104

(22) Filed: Jun. 30, 2009

(65) Prior Publication Data

US 2010/0054759 A1 Mar. 4, 2010

(30) Foreign Application Priority Data

Aug. 29, 2008 (JP) ................................. 2008-221268

(51) Int. Cl.
*H04B 10/06* (2006.01)
*H04B 10/00* (2013.01)
(52) U.S. Cl.
USPC ............................ 398/208; 398/147; 398/202
(58) Field of Classification Search
USPC .................... 398/202–214, 81, 136, 147, 149
See application file for complete search history.

(56) References Cited

U.S. PATENT DOCUMENTS

| 5,796,725 | A | 8/1998 | Muraoka |
| 2002/0024996 | A1 | 2/2002 | Agazzi et al. |
| 2004/0086275 | A1 | 5/2004 | Lenosky et al. |
| 2004/0086276 | A1 | 5/2004 | Lenosky et al. |
| 2005/0196176 | A1* | 9/2005 | Sun et al. ........................ 398/152 |
| 2005/0243903 | A1* | 11/2005 | Agazzi ............................ 375/219 |
| 2008/0031633 | A1 | 2/2008 | Hoshida et al. |
| 2009/0041468 | A1* | 2/2009 | Kato ................................ 398/137 |
| 2009/0129788 | A1* | 5/2009 | Seimetz ........................... 398/208 |

FOREIGN PATENT DOCUMENTS

| JP | 5-304485 | 11/1993 |
| JP | 8-79136 | 3/1996 |
| JP | 2006-506030 | 2/2006 |
| JP | 2006-332920 | 12/2006 |
| JP | 2008-035319 | 2/2008 |
| WO | 2007/045072 | 4/2007 |
| WO | WO 2008000401 A1 * | 1/2008 |
| WO | 2008/036356 | 3/2008 |

OTHER PUBLICATIONS

Cuihong, Zhang, et al., "Application of Electronic Dispersion Compensation Technology in High-Speed Optical Transmission Systems", Institute of Optoelectronics Science and Engineering, 2005, pp. 52-55.*

(Continued)

*Primary Examiner* — Daniel Dobson
(74) *Attorney, Agent, or Firm* — Staas & Halsey LLP

(57) ABSTRACT

In a digital signal processing circuit of an optical receiver applicable to this method for electric power supply control, tap coefficients of a filter used in a waveform equalization section are calculated in a tap coefficient calculating section, based on a state of an optical fiber transmission line. Then, among the calculated tap coefficients, a tap coefficient for which an absolute value is less than a previously determined threshold is determined, and electric power supply to a circuit part of a filter corresponding to the tap coefficient is stopped. As a result, for an optical receiver that performs digital signal processing, it is possible to reduce the power consumption, while realizing waveform equalization at a high accuracy.

20 Claims, 16 Drawing Sheets

(56) References Cited

OTHER PUBLICATIONS

Appeal No. 2010-006083, Decision on Request for Rehearing, Ex parte Gary M. Katz, U.S. Appl. No. 09/828,122, Mar. 29, 2011, p. 3.*
Appeal No. 2010-010376, Decison on Appeal, Ex parte John Kenneth Gallant, U.S. Appl. No. 10/101,199, Jun. 19, 2013, p. 5.*
European Abstract, Publication No. 0 541 225, Published May 12, 1993.
Extended European Search Report dated Dec. 2, 2009 in corresponding Application No. 09008511.9.
Tschanz J. et al. "A low-power, reconfigurable adaptive equalizer architecture" Signals, Systems, and Computers, 1999. Conference Record of the Thirty Oct. 24, 1999; Oct. 24, 1999-Oct. 27, 1999 Piscataway, NJ, USA, IEEE, US ,vol. 2, Oct. 24, 1999 pp. 1391-1395.
Manish Goel et al: "Dynamic Algorithm Transforms for Low-Power Reconfigurable Adaptive Equalizers" IEEE Transactions on Signal Processing, IEEE Service Center, New York, NY, US, vol. 47, No. 10, Oct. 1, 1999.
Manish Goel et al: "Dynamic Algorithm Transformations (DAT)—A Systematic Approach to Low-Power Reconfigurable Signal Processing" IEEE Transactions on Very Large Scale Integration (VLSI) Systems, IEEE Service Center, Piscataway, NJ, US, vol. 7, No. 4, Dec. 1, 1999.

"Electronic Post-Compensation for Nonlinear Phase Fluctuations in a 1000-km 20-Gbit/s Optical Quadrature Phase-shift Keying Transmission System Using the Digital Coherent Receiver", Kazuro Kikuchi, Optics Express, vol. 16, No. 2, pp. 889-896 (Jan. 21, 2008).
Generalized data-aided multi-symbol phase estimation for improving receiver sensitivity in direct-detection optical m-ary DPSK, Xiang Liu, Optics Express, vol. 15, No. 6, pp. 2927-2939 (Mar. 19, 2007).
"Signal Design and Detection in Presence of Nonlinear Phase Noise", Alan Pak Tao Lau et al., Journal of Lightwave Technology, vol. 25, No. 10, pp. 3008-3016 (Oct. 2007).
Chinese Office Action issued Nov. 27, 2012, in corresponding Chinese Patent Application No. 200910140374.2.
Zhang Cuihong et al., "Application of Electronic Dispersion Compensation Technology in High-Speed Optical Transmission Systems", Institute of Optoelectronics Science and Engineering, 2005, pp. 52-55.
Patent Abstracts of Japan Publication No. 2006-332920, published Dec. 7, 2006.
Japanese Office Action issued Aug. 28, 2012 in corresponding Japanese Patent Application No. 2008-221268.

* cited by examiner

METHOD FOR ELECTRIC POWER SUPPLY OF OPTICAL RECEIVER, DIGITAL SIGNAL PROCESSING CIRCUIT, AND OPTICAL RECEIVER

CROSS-REFERENCE TO RELATED APPLICATION

This application is based upon and claims the benefit of priority of the prior Japanese Patent Application No. 2008-221268, filed on Aug. 29, 2008, the entire contents of which are incorporated herein by reference.

FIELD

The embodiments discussed herein are related to a control technique for efficiently performing electric power supply to an optical receiver used in optical fiber communication, and in particular relates to a method for electric power supply control of an optical receiver that performs digital signal processing, and to a digital signal processing circuit, and an optical receiver.

BACKGROUND

At present, digital reception methods are applied to optical receivers used for optical fiber communication systems to thereby achieve a reduction in apparatus cost. In particular, in an optical receiver to which a digital coherent reception method is applied, it is possible to perform dispersion compensation by digital signal processing after an optical signal has been coherently received and converted to an electrical signal. Since it is not necessary to perform dispersion compensation in an optical condition where high cost dispersion compensation fiber and the like is used, a significant reduction in cost for the apparatus cost can be expected.

Specifically, in a digital coherent optical receiver, an optical signal produced by mixing reception signal light with local oscillator light is converted to a digital electric signal by a photoelectric transducer and an AD converter. Then in a digital signal processing circuit to which the digital signal is input, waveform equalization processing and signal discrimination processing and the like for realizing the abovementioned dispersion compensation, are performed. This digital signal processing circuit has a large scale circuit configuration for realizing various functions by arithmetic processing of the digital signal, and often a large part of this is occupied by a circuit block that performs arithmetic processing for waveform equalization.

As a conventional technique related to waveform equalization in the above digital signal processing circuit, there has been proposed a technique in which filtering of the reception signal is performed using a filter or the like having a finite impulse response (FIR) characteristic for example, and a plurality of variable parameters (tap coefficients) serving as weighting for the FIR filters and the like, are appropriately set corresponding to a monitor result of the signal quality, to thereby suppress waveform degradation attributable to waveform dispersion or polarization mode dispersion (for example, refer to Japanese Laid-open Patent Publication No. 2008-35319).

However, in the above conventional optical receiver that realizes waveform equalization using an FIR filter and the like, there is a problem in that the power consumption is large. That is, the influence of chromatic dispersion in the optical fiber transmission line becomes noticeable as the transmission speed of the optical signal is increased. Furthermore, when receiving an ultra high speed optical signal of around 40 Gb/s, the influence of polarization mode dispersion can also not be ignored. Therefore it is necessary to perform compensation for waveform dispersion and polarization mode dispersion at high accuracy. In order to realize such high accuracy dispersion compensation, it is necessary to increase the number of taps of the filter used in waveform equalization, and to optimize each of the tap coefficients according to the state of the optical fiber transmission line. If the number of taps of the filter is increased, the power necessary to effectively operate the filter also increases. Therefore the power consumption of the optical received is increased. In other words, in the conventional optical receiver there is a problem in that, in order to perform waveform equalization at high accuracy by digital signal processing, an increase in power consumption cannot be avoided.

SUMMARY

According to an aspect of the invention, the method for electric power supply control of an optical receiver proposed here is a method for controlling a supply state of electric power to an optical receiver that receives signal light propagated in an optical fiber transmission line, converts the signal light into a digital electrical signal, and digital signal processes the obtained reception signal, to thereby reproduce data, and is applied when the digital signal processing performed in the optical receiver includes an operation for performing waveform equalization of the reception signal. This method for electric power supply control includes: an operation for calculating a variable parameter used in waveform equalization of the reception signal, based on a state of the optical fiber transmission line; an operation for determining a variable parameter among the calculated variable parameters, for which an absolute value is less than a previously determined threshold; and an operation for generating, for the circuit that performs waveform equalization of the reception signal, an electric power control signal for stopping electric power supply to a circuit part that corresponds to the determined variable parameter.

According to the method for electric power supply control of an optical receiver in the above proposal, among the variable parameters calculated based on the state of the optical fiber transmission line, the variable parameter for which the absolute value is less than a threshold value, that is, the variable parameter for which the influence on waveform equalization of the reception signal is small, is determined, and electric power supply to the circuit part that corresponds to this variable parameter is stopped. Therefore it is possible to reduce power consumption, while realizing waveform equalization at a high accuracy.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a description of embodiments of the invention, with reference to the accompanying drawings.

Figure 1:
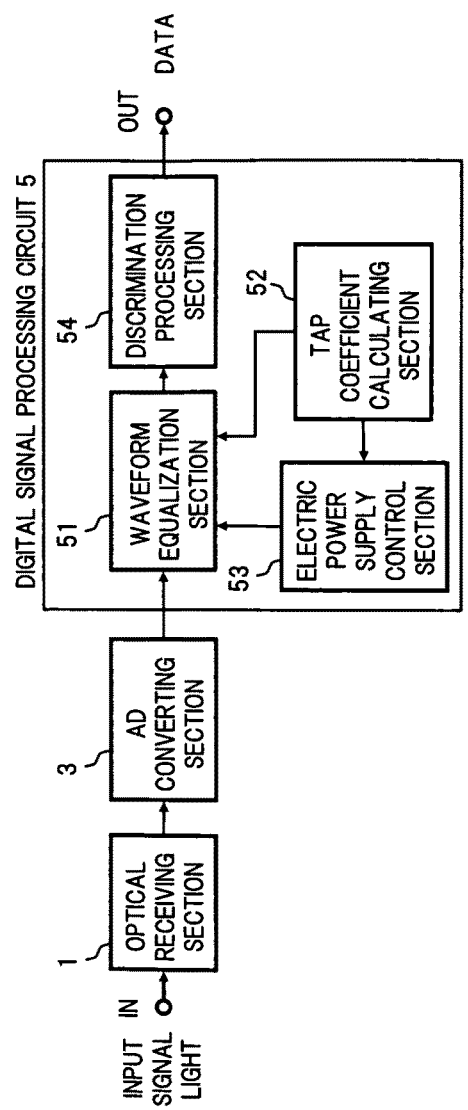
FIG. 1 is a block diagram illustrating a configuration of an optical receiver of a first embodiment.

FIG. 1 is a block diagram illustrating a configuration of a first embodiment of an optical receiver that uses a method for electric power supply control.

In FIG. 1, the optical receiver of this embodiment comprises for example; an optical receiving section 1 that receives input signal light and converts this to an electrical signal, an AD conversion section 3 that converts an analog electric signal converted in the optical receiving section 1 into a digital signal to obtain a reception signal; and a digital signal processing circuit 5 that performs digital signal processing on the reception signal that has been converted in the AD conversion section 3 to reproduce data. Furthermore, the digital signal processing circuit 5 comprises, as functional blocks thereof: a waveform equalization section 51 that performs waveform equalization on the reception signal; a filter coefficient calculation section 52 that calculates a filter coefficient (variable parameter) used in the waveform equalization section 51, an electric power supply control section 53 that controls electric power supply to the waveform equalization section 51 corresponding to a value of the filter coefficient, and a discrimination processing section 54 that discrimination processes the reception signal that has been waveform equalized in the waveform equalization section 51 to reproduce data. Hereunder is a specific description of the configuration of the parts of the optical receiver.

Figure 2:
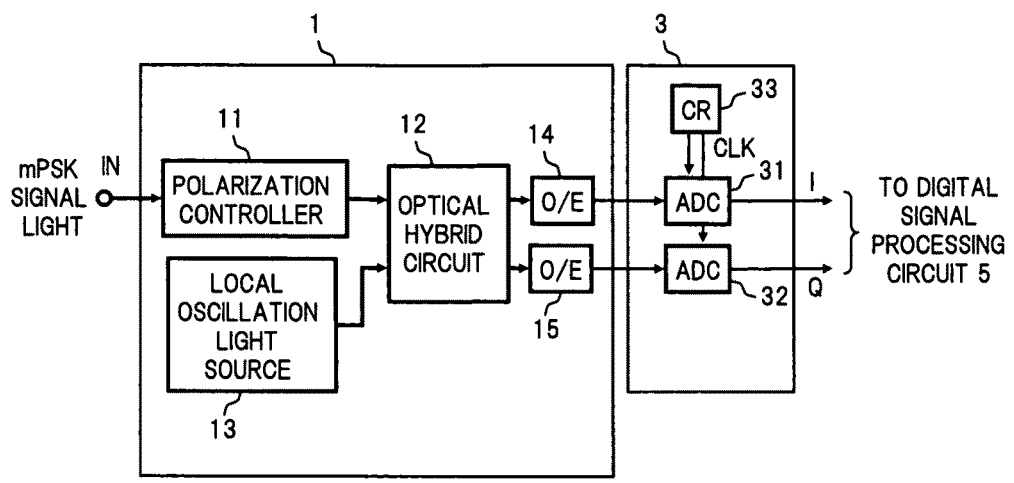
FIG. 2 is a block diagram illustrating a configuration example of an optical receiving section and an AD conversion section of the first embodiment.

For the optical receiving section 1, for example assuming a case where signal light that has been subjected to multivalue phase shift keying (PSK) (referred to hereunder as mPSK signal light where "m" is $2^n$ (n=1, 2, 3, etc.)) is coherently received as the input signal light, then it is possible to apply a configuration such as illustrated at the left side of FIG. 2. In the example of FIG. 2, mPSK signal light that has been propagated in an optical fiber transmission line (not illustrated in the drawing) connected to an input port IN of the optical receiver, is provided to one input terminal of an optical hybrid circuit 12 via a polarization controller 11. To another input terminal of this optical hybrid circuit 12 is provided light output from a local oscillation light source 13, and the polarization state of the mPSK signal light with respect to the polarization state of the local oscillation light is variably controlled by the polarization controller 11. The optical hybrid circuit 12 mixes the input mPSK signal light and the local oscillation light, and respectively outputs light of two sets with optical phases at 90 degrees to each other, to optical detectors (O/E) 14 and 15. The optical detectors 14 and 15 receive the output light from the optical hybrid circuit 12, and perform photoelectric conversion detection.

The AD conversion section 3, for example as illustrated on the right side of FIG. 2, has two AD converters (ADC) 31 and 32, and a clock generating circuit (CR) 33. The AD converters 31 and 32 convert the analog reception signals output from the optical detectors 14 and 15 into digital signals by sampling in accordance with a clock signal CLK output from the clock generating circuit 33. Digital signals I and Q output from the respective AD converters 31 and 32, are input to a waveform equalization section 51 of a digital signal processing circuit 5.

As a specific configuration of the optical receiving section 1 and the AD conversion section 3, an example is given here for the case where mPSK signal light is coherently received. However, the modulation format for the signal light capable of being processed with the optical receiver of the invention is not limited to mPSK, and the invention is effective for known modulation formats applicable to digital reception methods (for example an m-level Quadrature Amplitude Modulation (MQAM) modulation format and the like). Furthermore, a desirable reception method for the invention is the coherent reception method. However for example the invention can also be adapted for a direct detection system.

For the waveform equalization section 51, the configuration may be such that, for example, a general filter (referred to hereunder as an FIR filter) having a finite impulse response (FIR) characteristic is applied, so that waveform equalization of the reception signal is possible without performing bandwidth limiting. This FIR filter can be realized by a circuit configuration such as illustrated at the top left of FIG. 3, in which a plurality of delay circuits 511 connected in series, a plurality of complex multiplication circuits 512, and an adding circuit 513, are combined together. The delay circuits 511 delay the reception signals I and Q from the AD converters 31 and 32 for a time interval T. The input signal prior to delay, and the signals delayed by the delay circuits 511 each have a part that is tapped and delivered to the corresponding complex multiplication circuits 512. Here as the tap number, the tap on the input side of the first stage delay circuit 511 is denoted 0, the tap on the output side is denoted 1, and the taps on the output sides of the delay circuits 511 of the latter stages are denoted in sequence from 2 to k. The complex multiplication circuits 512 multiply the tapped $i^{th}$ component (i=0 to k) by a tap coefficient Ci calculated in the tap coefficient calculating section 52, and output the result to the adding circuit 513. The tap coefficient Ci is a variable parameter set within a range from −1 to +1. The adding circuit 513 takes the sum total of the output components from the complex multiplication circuits 512. As a result, signals I' and Q' for which the reception signals I and Q have been waveform equalized in accordance with the filter characteristics corresponding to the setting of the tap coefficients C0 to Ck are output from the adding circuit 513, and delivered to the discrimination processing section 54.

The tap coefficient calculating section 52 calculates the respective tap coefficient C0 to Ck of the FIR filter according to the state of the optical fiber transmission line connected to the input port IN of the optical receiver, so that optimum dispersion compensation by the waveform equalization section 51 is realized. The calculation results of the tap coefficient calculating section 52 are provided to the multiplication circuit 512 corresponding to the FIR filter, and are also transmitted to the electric power supply control section 53. For the state of the optical fiber transmission line, the generation amount or the like of chromatic dispersion or polarization mode dispersion that cause waveform deterioration of the reception signal light, is expressed as a parameter. If these parameters, in particular for chromatic dispersion, are basically divided up for the type and length of the optical fiber used in the optical fiber transmission line, and the signal wavelength, then values corresponding to these can be determined beforehand, and the dispersion compensation amount set corresponding to these value can be provided to the tap coefficient calculating section 52 from the outside.

To give an example of the calculation method in the tap coefficient calculating section 52, a transfer function H ($\omega$) of the signal light for when this is L(m) propagated by an optical fiber having a chromatic dispersion value $\beta_2$ (s$^2$/m), can be expressed by the following equation (1).

$$H(\omega)=\exp(-j\omega^2\beta_2 L/2) \quad (1)$$

A transfer function H$^{-1}$ ($\omega$) of an equalization filter for compensating chromatic dispersion of the signal light is expressed by the following equation (2).

$$H^{-1}(\omega)=\exp(j\omega^2\beta_2 L/2) \quad (2)$$

The tap coefficient Ck of the FIR filter corresponding to the above equation (2), can be calculated according to the following equation (3), with the inverse of the sampling frequency in the AD converters 31 and 32 as $T_s$.

$$Ck = \frac{1}{2\pi}\int_{-\pi}^{\pi}\exp\left[j\left(\frac{\omega}{T_s}\right)^2\beta_2 L/2 + j\omega k\right]d\omega \quad (3)$$

The electric power supply control section 53, performs a comparison between the respective tap coefficients C0 to Ck transmitted from the tap coefficient calculating section 52, and a previously determined threshold Cth (positive number), and if the absolute value of a tap coefficient Cj (j=0 to k) is less than the threshold Cth, electric power control signals Si and Sq for stopping supply of electric power to the circuit part that corresponds to the filter coefficient Cj are generated, and these are output to the FIR filter. Here the electric power control signal Si stops the supply of electric power to the circuit part related to the real part of Cj, based on a comparison between the absolute value of the real part of the tap coefficient Cj and the threshold Cth. Furthermore, the electric power control signal Sq stops the supply of electric power to the circuit part related to the imaginary part of Cj, based on a comparison between the absolute value of the imaginary part of the tap coefficient Cj and the threshold Cth. However, in order to simplify the circuit, the construction may be such that only Si serving as a common electric power control signal for both the real part and imaginary parts of Cj is generated based on the results of comparing the absolute value of the complex number Cj with the threshold Cth, without handling the real part and the imaginary part of the filter coefficient Cj individually. In regards to the abovementioned threshold Cth, this is determined in accordance with the specifications and the like of the optical receiver, and an appropriate value may be set beforehand, based on a permissible tolerance for the error of the waveform equalization (dispersion compensation) by the FIR filter. This may be adaptively controlled in consideration of a balance between the circuit power consumption and the transmission signal quality during operation. In the above manner, the electric power supply control section 53 has a function as a variable parameter determining device and an electric power control signal generating device.

Figure 3:
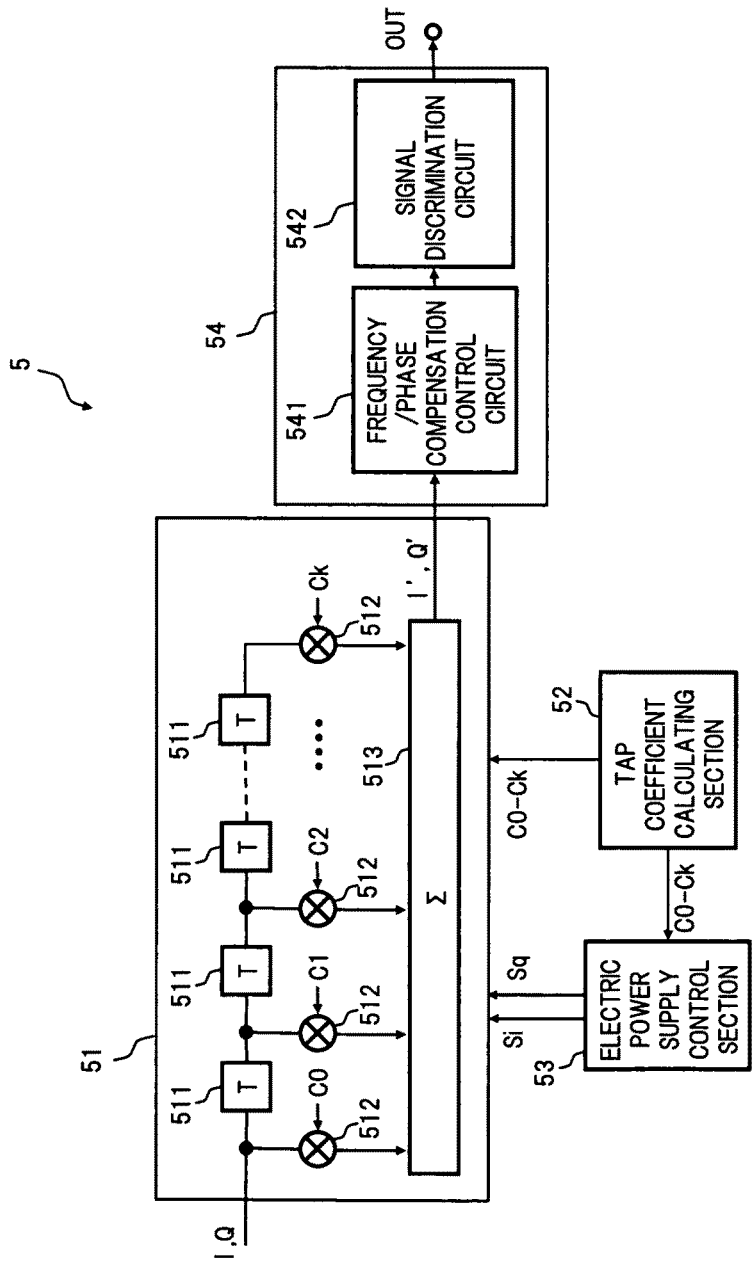
FIG. 3 is a block diagram illustrating a configuration example of a digital signal processing circuit of the first embodiment.
Figure 4:
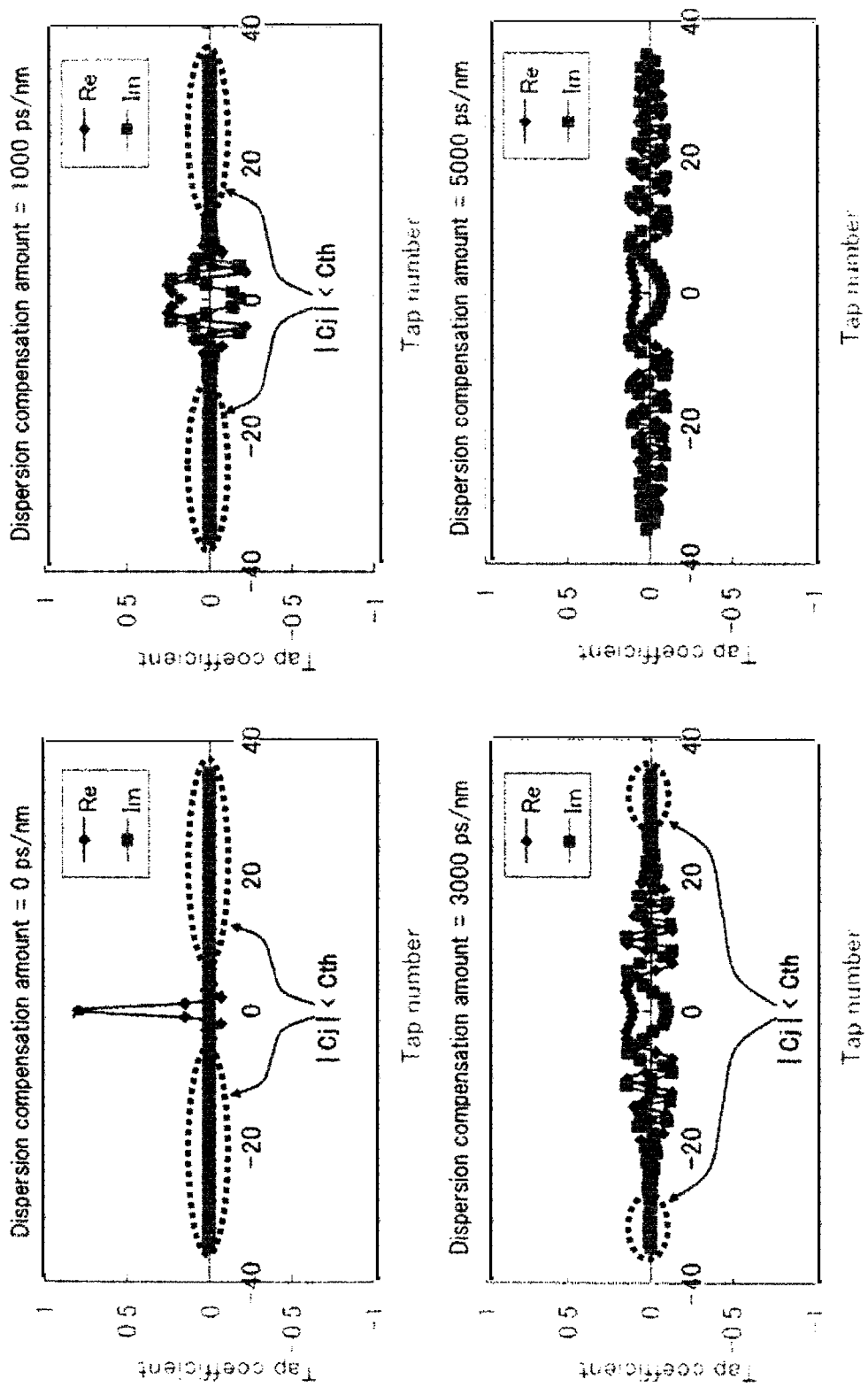
FIG. 4 is an example illustrating FIR filter tap coefficients that are calculated in the first embodiment, for each dispersion compensation amount.

FIG. 4 is an example illustrating FIR filter tap coefficients that are calculated by the tap coefficient calculating section 52, for each dispersion compensation amount. The x-axis in the figure illustrates the tap number, and the y-axis illustrates the tap coefficient. Here positive and negative numbers are attached to the tap to calculate the tap coefficient. In the configuration example of the FIR filter illustrated in FIG. 3, there is no correspondence to the negative filter number. However by extending the delay circuits 511 forward and sequentially connecting negative number taps further ahead of the zero number tap, it is possible to consider an FIR filter corresponding to both positive and negative filter numbers.

In the calculation example of FIG. 4, when the dispersion compensation amount is 0 ps/nm, among the tap coefficients spanning the positive/negative numbers, only the tap coefficient for 0 and its vicinity takes a comparatively large absolute value, and the other tap coefficients become approximately zero. In this case, as illustrated by the broken line region in the figure, the absolute values for the tap coefficients other than for 0 and its vicinity become less than the threshold Cth, becoming stop objects for electric power supply. If the dispersion compensation amount is increased to 1000 ps/nm, the absolute value of the tap coefficients corresponding to where the tap number is from zero to around±10 becomes comparatively large, and the absolute value of the tap coefficients with tap numbers remote from these becomes smaller than the threshold Cth, becoming stop objects for electric power supply. If the dispersion compensation amount is further increased to 3000 ps/nm, the absolute value of the tap coefficients corresponding to where the tap number is from zero to around±30 becomes comparatively large, and the absolute value of the tap coefficients with tap numbers remote from these becomes smaller than the threshold Cth, becoming stop objects for electric power supply. Furthermore, even if the tap number is within the range of ±30, then in regards to the tap number where either one of the absolute values for the real part (Re) or the imaginary part (Im) of the tap coefficient is less than the threshold Cth (for example the imaginary part of the tap numbers±10, the real part of the tap numbers±17 or the like), this gives a stop object for electric power supply for the calculation circuit of one part. If the dispersion compensation amount is increased to 5000 ps/nm, the absolute value of all the tap coefficients becomes greater than the threshold Cth. In this case, basically electric power is supplied to all of the circuit parts of the FIR filter. However, in regards to a filter number where the absolute value of either one of the real part or the imaginary part of the filter coefficient is less than the threshold Cth, this gives a stop object for electric power supply for the calculation circuit of one part.

As a specific method for stopping supply of electric power to the circuit part that corresponds to the tap coefficient Cj for which the absolute value is less than the threshold Cth, in accordance with the control signals Si and Sq output from the electric power supply control section 53, for example it is possible to stop the electric power supply to the complex multiplication circuits 512 of the FIR filter that are provided with the tap coefficient Cj. Furthermore, the electric power supply to the circuit element that combines the component corresponding to the tap coefficient Cj in the adding circuit 513 with another component may be stopped. Moreover, when the tap coefficients Cj to Ck for the $j^{th}$ coefficient and thereafter are all smaller than the threshold Cth, the electric power supply to a buffer circuit provided as a delay circuit 511 from the j stage to the k stage may be stopped. In addition, while here omitted from the drawing, when a buffer circuit for skew adjustment associated with the FIR filter is provided, it is also possible to stop electric power supply to this buffer circuit.

In regards to the above method of stopping electric power supply, not only is this for when stopping the electric power for driving the circuit part that becomes the control object, that is, stopping the so called power source, but also is for stopping a clock signal that is supplied to the circuit parts. In the case of stopping the clock signal, supply of the clock signal is stopped when the output of the circuit part becomes zero, or the circuit output is forcefully made zero simultaneous with stopping the clock signal. It is also possible to simultaneously perform stopping of the power source and stopping of the clock signal, or to perform either alone. If the power source and the clock signal are stopped simultaneously, power consumption of the optical receiver can be effectively reduced.

The discrimination processing section 54, as illustrated for example at the right side of FIG. 3, has a frequency/phase compensation control circuit 541, and a signal discrimination circuit 542. The frequency/phase compensation control circuit 541 subjects the signals I' and Q' that have been waveform equalized in the waveform equalization section 51, to a known processing such as frequency offset compensation or phase synchronization, and outputs the result to the signal discrimination circuit 542. The signal discrimination circuit 542 performs discrimination processing on the signal from the frequency/phase compensation control circuit 541, to thereby generate data. The reception data is output to the outside of the optical receiver via an output port, or is output to a separate circuit block that performs necessary signal processing such as frame processing or forward error correction (FEC) decode processing.

Figure 5:
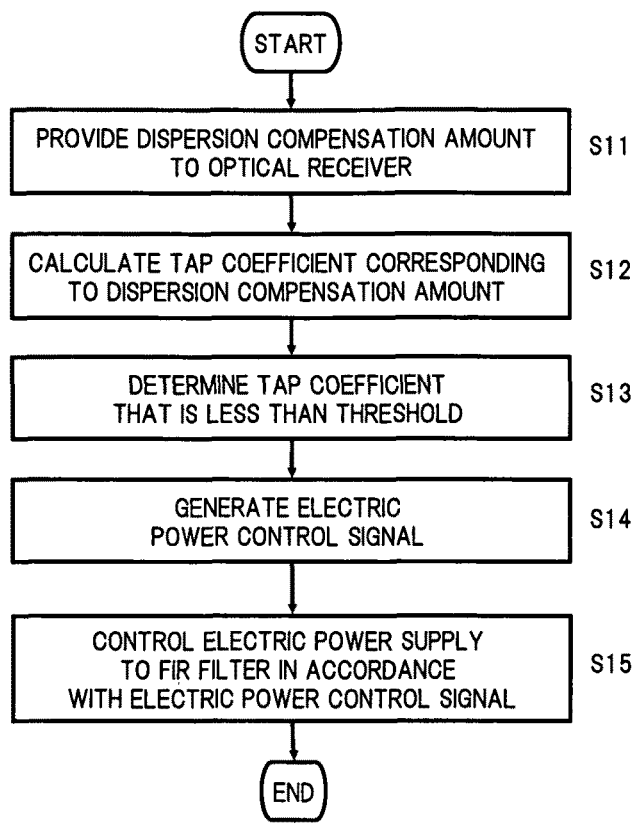
FIG. 5 is a flowchart illustrating a control operation for electric power supply to a waveform equalization section, in the first embodiment.

Next is a detailed description of a control operation for electric power supply to the waveform equalization section 51 by the aforementioned electric power supply control section 53, with reference to the flowchart of FIG. 5.

In this embodiment, in the stage prior to starting operation of the signal light, that is, before the optical receiver receives signal light from the optical fiber transmission line connected to the input port IN of the optical receiver, optimization of the electric power supplied to the waveform equalization section 51 is performed by the electric power supply control section 53. More specifically, at first, corresponding to the chromatic dispersion value determined according to type and length of the optical fiber transmission line connected to the input port IN, a dispersion compensation amount necessary for compensating the chromatic dispersion produced in the reception signal light, is determined, and this dispersion compensation amount is provided to the tap coefficient calculating section 52 of the optical receiver (S11 illustrated in the flowchart of FIG. 5).

In the tap coefficient calculating section 52, values for the tap coefficients C0 to Ck of the FIR filter that correspond to the provided dispersion compensation amount are calculated in accordance with the abovementioned equation (3) (S12). More specifically, in the case where for example 1000 ps/nm is provided as the dispersion compensation amount, then considering the abovementioned calculation example of FIG. 4, tap coefficients corresponding to the tap numbers illustrated at the top right are calculated. The tap coefficients C0 to Ck obtained by the tap coefficient calculating section 52 are provided to the corresponding complex multiplication circuits 512 of the FIR filter, and simultaneously, are also provided to the electric power supply control section 53.

In the electric power supply control section 53, a comparison is made between the absolute value for the tap coefficients C0 to Ck from the tap coefficient calculating section 52, and a previously determined threshold Cth, and a tap coefficient Cj for which the absolute value is less than the threshold Cth is determined (S13). Then, an electric power control signal for stopping supply of electric power to the circuit that correspond to the tap coefficient Cj is generated, and the electric power control signal is output to the FIR filter (S14). In the FIR filter that has received the electric power control signal from the electric power supply control section 53, electric power supply to the complex multiplication circuit 512 or the like corresponding to the tap coefficient Cj that is less than the threshold Cth is stopped (S15).

When in the above manner, electric power supply to the FIR filter prior to starting operation is complete, operation of the signal light is started, with the setting for the respective tap coefficients of the FIR filter, and the electric power supply state maintained, and the signal light propagated in the optical fiber transmission line is coherently received by the optical receiver. At this time, in the digital signal processing circuit 5, among the circuit parts that correspond to the respective tap coefficients C0 to Ck of the FIR filter, only the circuit part that corresponds to the tap coefficient having an absolute value greater than or equal to the threshold Cth receives electric power supply to be effectively operated, and waveform equalization (dispersion compensation) of the digital signals I and Q from the AD converters 31 and 32 is performed by the FIR filter. At this time, electric power is not supplied to the circuit parts that correspond to the tap coefficients considered to be for a permissible range of error where the influence on the dispersion compensation is small. Therefore it is possible to reduce the power consumption of the optical receiver, while realizing excellent reception performance due to effective dispersion compensation.

Next is a description of an application example related to the first embodiment.

Figure 6:
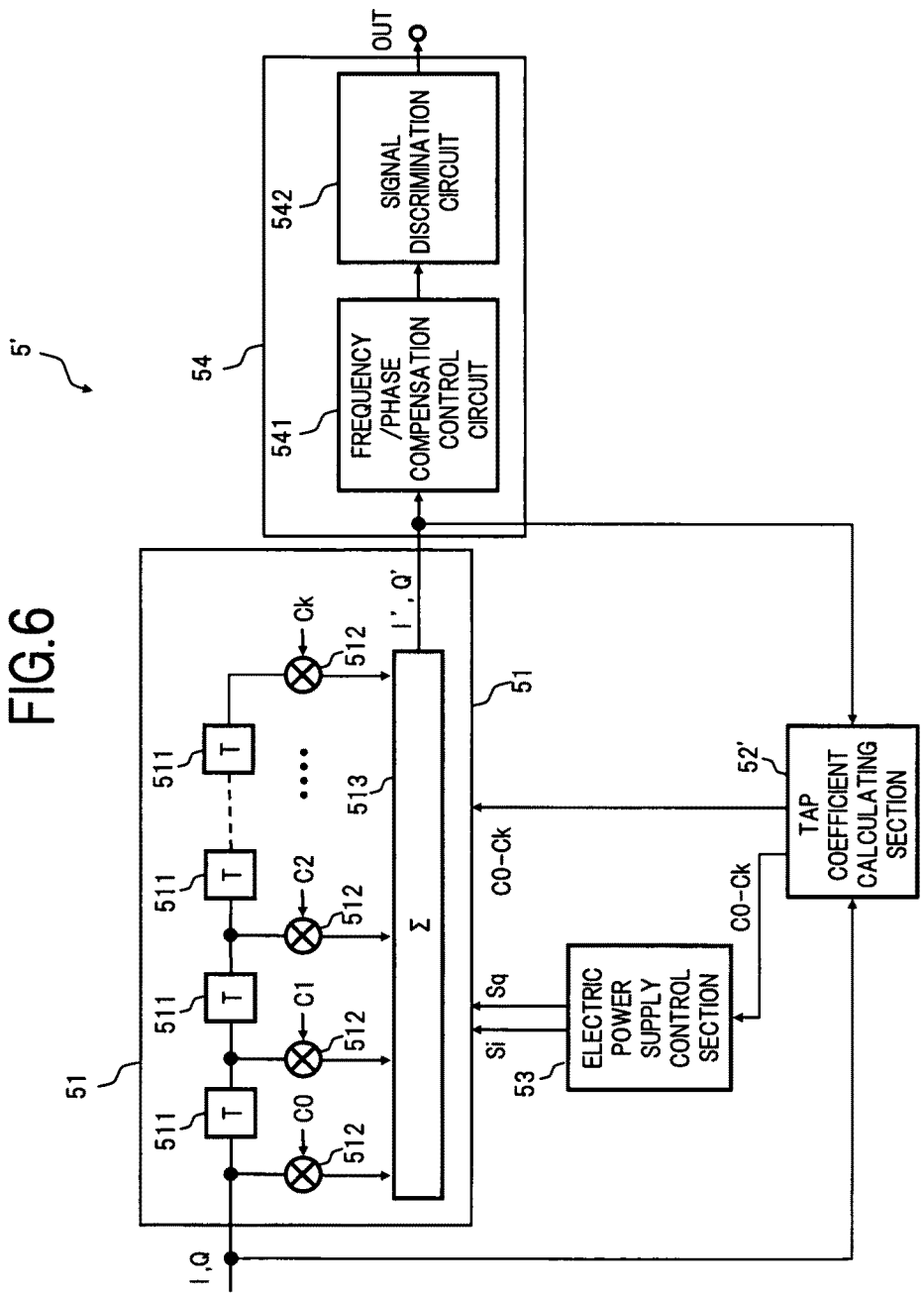
FIG. 6 is a block diagram illustrating a configuration of a digital signal processing circuit in a first application example.

FIG. 6 is a block diagram illustrating a configuration of a digital signal processing circuit in a first application example. The overall configuration of the optical receiver in the first application example is the same as the configuration of the aforementioned first embodiment (FIG. 1). Hereunder parts the same as or corresponding to the configuration of the first embodiment are denoted by the same reference symbols, and description of these parts is omitted.

The digital signal processing circuit 5' illustrated in FIG. 6 performs so called adaptive waveform equalization, by monitoring the state of the digital signals input and output to the waveform equalization section 51 after starting operation of the signal light, and variably controlling the respective tap coefficient C0 to Ck of the FIR filter adaptively. In this adaptive waveform equalization, the tap filter that is calculated before starting operation of the signal light, for the FIR filter that performs waveform equalization, as in the case of the above described first embodiment, is also fixedly provided after starting operation, and for this, the method of control is different in the following points. That is to say, the adaptive waveform equalization is a control method where, in accordance with an algorithm determined beforehand, waveform quality information such as a difference of the actual waveform with respect to a theoretical waveform for the reception signal, is monitored continually or at a predetermined period, after starting operation, and corresponding to the monitor result, the respective tap coefficients of the FIR filter are recalculated and fed back to the FIR filter, so that the reception signal after waveform equalization becomes close to ideal. As the waveform quality information, as well as the abovementioned difference of the actual waveform with respect to the theoretical waveform of the reception signal, the number of error detections detected by the error correction circuit, or the number of error corrections may be used.

More specifically, a part of the signals I and Q input to the FIR filter, and a part of the signals I' and Q' output from the FIR filter are taken out and delivered to a tap coefficient calculating section 52'. The tap coefficient calculating section 52' uses the delivered signals I and Q and the signals I' and Q' and recalculates the respective tap coefficients C0 to Ck in accordance with a previously determined algorithm for filter optimization, to thereby perform the adaptive waveform equalization as described above. The tap coefficients C0 to Ck that have been recalculated in the tap coefficient calculating section 52', are provided to the corresponding complex multiplication circuits 512 of the FIR filter, and are also transmitted to the electric power supply control section 53.

Figure 7:
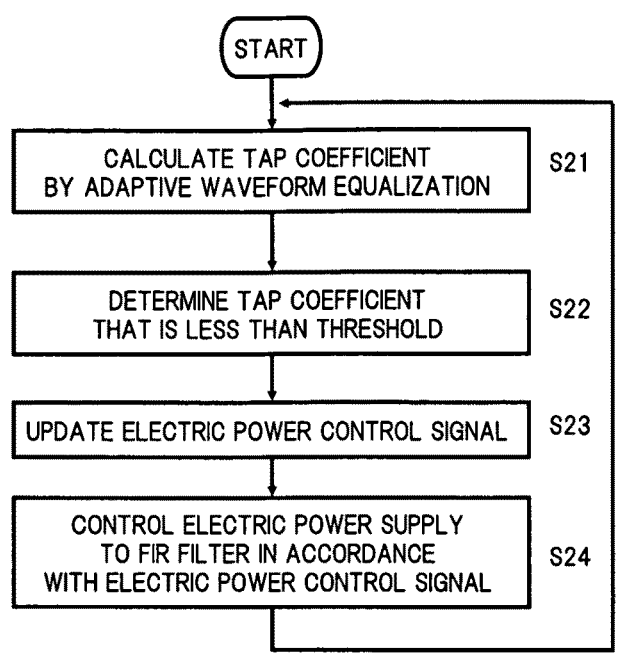
FIG. 7 is a flowchart illustrating a control operation for electric power supply to a waveform equalization section, in the first application example.

The flowchart of FIG. 7 illustrates a control operation for the electric power supply that is performed after starting operation in the aforementioned digital signal processing circuit 5'. This control operation for after operation start is in accordance with the aforementioned flowchart illustrated in FIG. 5, and hence description is omitted here. When the operation is started and the signal light propagated in the transmission line is received by the optical receiver, at first adaptive waveform equalization is performed in the tap coefficient calculating section 52', and the recalculated tap coefficients C0 to Ck are transmitted to the electric power supply control section 53 (S21).

In the electric power supply control section 53, a comparison is made between the values for the respective tap coefficients C0 to Ck that have been recalculated by the tap coefficient calculating section 52', and a previously determined threshold Cth, and a tap coefficient Cj for which the absolute value is less than the threshold Cth is determined (S22). Then, an electric power supply control signal for stopping power supply to the circuit corresponding to the tap coefficient Cj is updated from the one for before operation start, and the updated electric power control signal is output to the FIR filter (S23). In the FIR filter that has received the electric power control signal from the electric power supply control section 53, electric power supply to the complex multiplication circuit 512 and the like, corresponding to the tap coefficient Cj that is less than the threshold Cth, is stopped (S24). This series of processing from S21 to S24 is executed continually during operation, or repeatedly at a predetermined period.

By performing adaptive waveform equalization by the digital signal processing circuit 5' as described above, then for example even in the case where the waveform of the reception signal changes moment by moment attributable to polarization mode dispersion, since the waveform of the reception signal is close to ideal, excellent reception characteristics can be stably realized. Furthermore, since the electric power supply to unnecessary circuit parts of the FIR filter corresponding to the value of the tap coefficients C0 to Ck recalculated by the adaptive waveform equalization, is stopped, it is possible to efficiently reduce the power consumption of the optical receiver.

Next is a description of a second application example of the abovementioned first embodiment.

Figure 8:
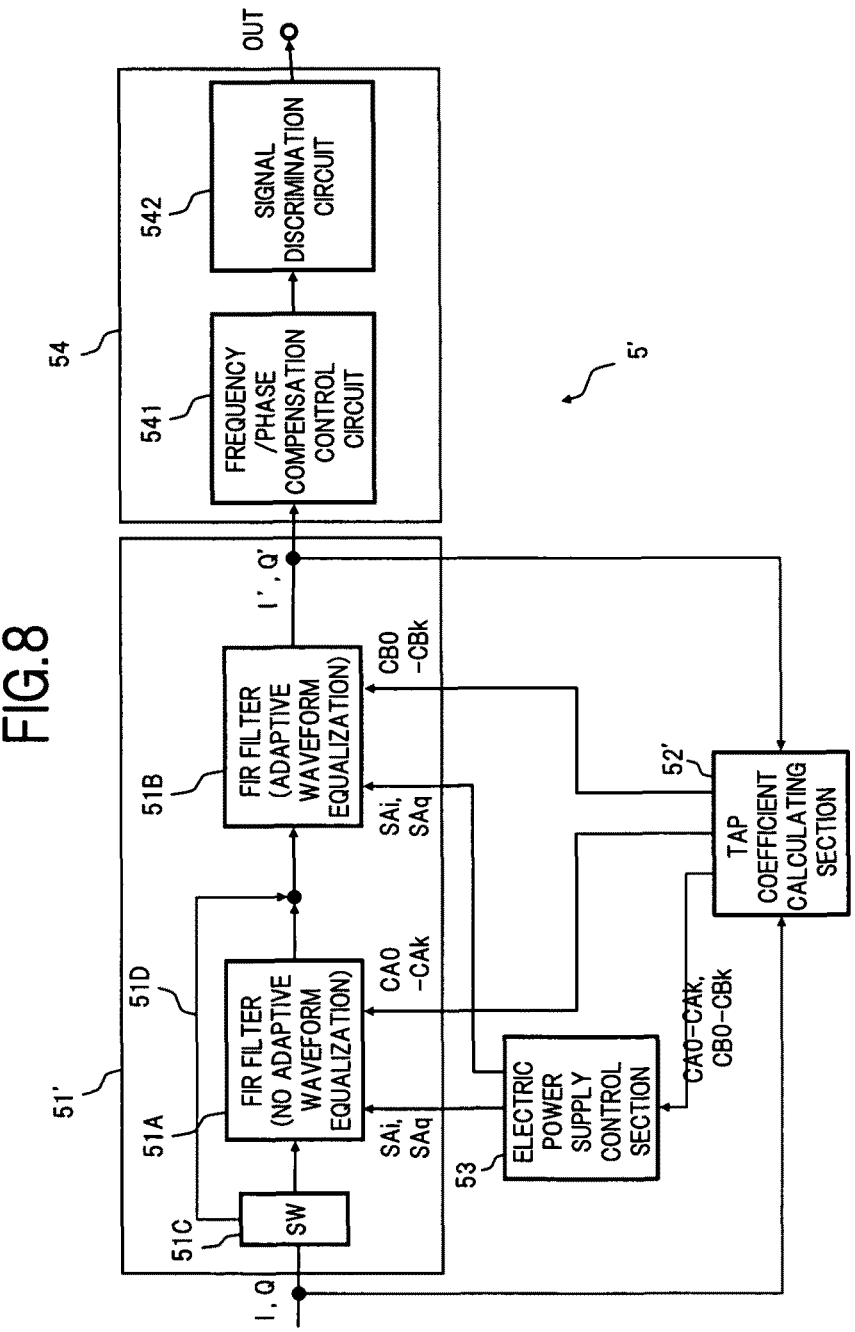
FIG. 8 is a block diagram illustrating a configuration of a digital signal processing circuit, in a second application example.

FIG. 8 is a block diagram illustrating a configuration of a digital signal processing circuit in the second application example.

In FIG. 8, a digital signal processing circuit 5' of the second application example is provided with a waveform equalization section 51' with two FIR filters 51A and 51B connected in series, and is configured with the adaptive waveform equalization described for the abovementioned first application example not applied to the former stage FIR filter 51A, but applied to the latter stage FIR filter 51B.

The circuit configuration of the respective FIR filters 51A and 51B is similar to the aforementioned circuit configuration illustrated at the top left of FIG. 3. To the former stage FIR filter 51A is input reception signals I and Q output from the AD converters 31 and 32 (FIG. 2) via a switch 51C. This switch 51C, in the case where, as described later, the input signal bypasses the former stage FIR filter 51A and is delivered to the latter stage FIR filter 51B, is able to switch over a path to a bypass route 51D. The tap coefficients CA0 to CAk of the former stage FIR filter 51A, and the tap coefficients CB0 to CBk of the latter stage FIR filter 51B are calculated by a tap coefficient calculating section 52' that is basically similar to the case of the aforementioned first application example. Moreover, instead of using the switch 51C, among the tap coefficients of the FIR filter 51A, one may be made 1, and the electric power supply to the remaining tap coefficients may be stopped.

Figure 9:
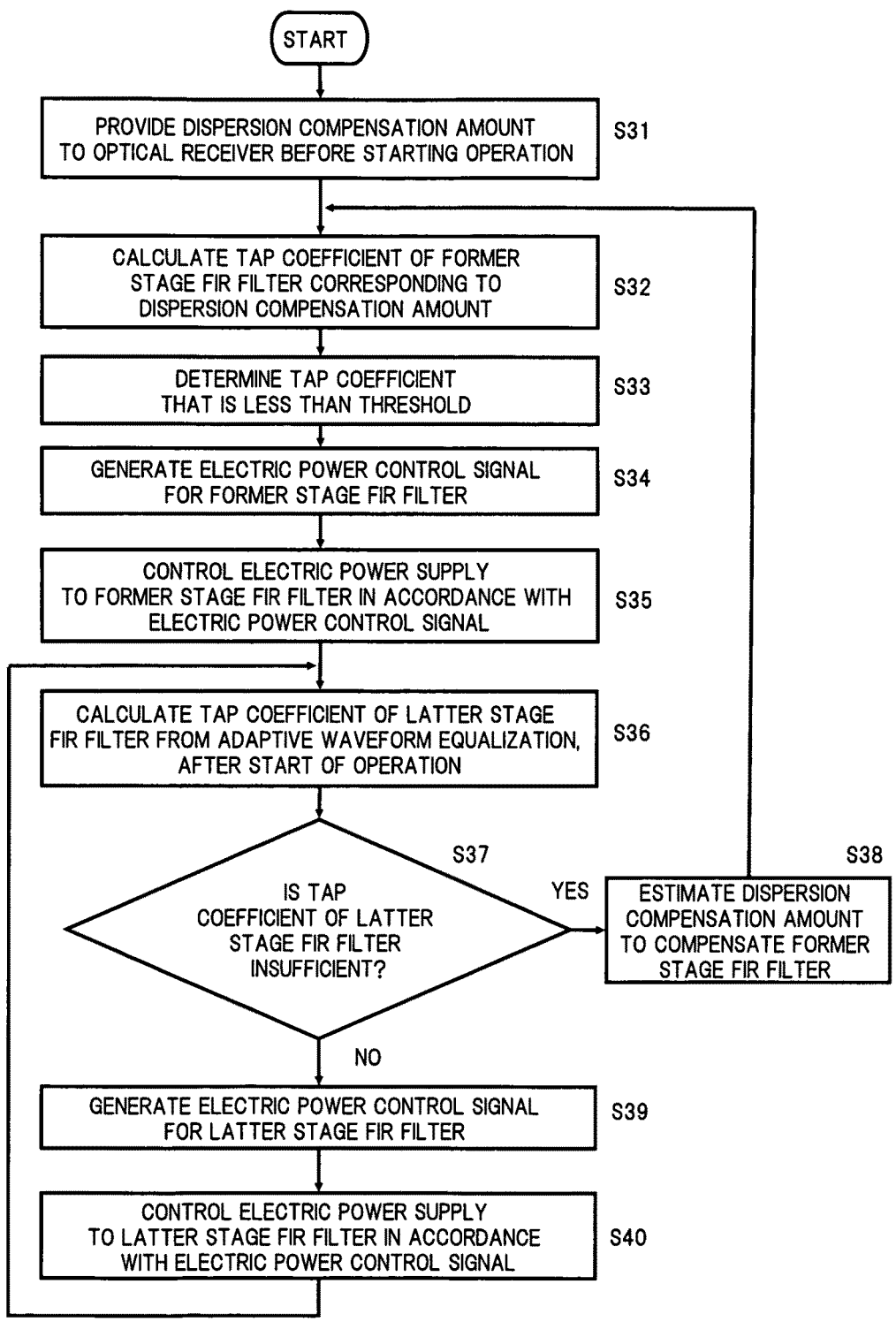
FIG. 9 is a flowchart illustrating a control operation for electric power supply to a waveform equalization section, in the second application example.

The flowchart of FIG. 9 illustrates calculation processing for tap coefficients performed before and after starting operation of the signal light in the aforementioned digital signal processing circuit 5', and control operation of the electric power supply. At first, in the stage prior to starting operation, a dispersion compensation amount necessary for compensating for chromatic dispersion and polarization mode dispersion produced in the reception signal, is set corresponding to a chromatic dispersion value determined according to the type and length of the optical fiber transmission line that is connected to the input port IN of the optical receiver, and this dispersion compensation amount is provided to the tap coefficient calculating section 52' (S31).

In the tap coefficient calculating section 52', the tap coefficients CA0 to CAk of the former stage FIR filter 51A that correspond to the provided dispersion compensation amount are calculated according to the aforementioned equation (3), and the calculation result is provided to the corresponding complex multiplication circuits of the FIR filter 51A, and at the same time, is also provided to the electric power supply control section 53 (S32). At this time, in the case where it is not necessary to use the former stage FIR filter 51A, that is, when the dispersion compensation amount is only small, and necessary dispersion compensation is possible with waveform equalization of only the latter stage FIR filter 51B, the switch 51C is switched to the bypass route 51D side. For the tap coefficients CB0 to CBk of the latter stage FIR filter 51B, since adaptive waveform equalization is performed after starting operation, a previously determined initial value is set at the stage before starting operation.

In the electric power supply control section 53, a comparison is made between the values of the respective tap coefficients CA0 to CAk from the tap coefficient calculating section 52' and a previously determined threshold Cth, and a tap coefficient CAj for which the absolute value is less than the threshold Cth is determined (S33). Then, electric power control signals SAi and SAq for stopping supply of electric power to the circuit parts that correspond to the tap coefficient CAj of the former stage FIR filter 51A are generated, and output to the former stage FIR filter 51A (S34). In the former stage FIR filter 51A that has received the electric power control signals from the electric power supply control section 53, electric power supply to the complex multiplication circuit or the like corresponding to the tap coefficient CAj is stopped (S35).

When in the above manner, setting of the tap coefficients of the former stage and latter stage FIR filters 51A and 51B, and electric power supply to the former stage FIR filter 51A prior to starting operation is complete, operation of the signal light is started, and the signal light propagated in the optical fiber transmission line is coherently received by the optical receiver. When reception processing of the signal light commences, then in the tap coefficient calculating section 52', adaptive waveform equalization is performed with respect to the latter stage FIR filter 51B, and the tap coefficients CB0 to CBk for making the reception signal waveform approach the ideal are calculated (S36).

At this time, if it is difficult to realize a desired waveform equalization with only adjustment of the transfer function of the latter stage FIR filter 51B, then optimization of the tap coefficient also included in the former stage FIR filter 51A may be performed. More specifically, if the number of taps of the latter stage FIR 51B is judged to be insufficient in the calculation process of the tap coefficient calculating section 52' (S37), then based on the transfer function that can be set for the latter stage FIR filter 51B, a dispersion compensation amount necessary for compensating in the former stage FIR filter 51A is estimated (S38), and the processing is returned to the aforementioned S32 to S35, and using the estimated dispersion compensation amount, the respective tap coefficients CA0 to CAk of the former stage FIR filter 51A are recalculated, and the electric power control signals SAi and SAq are updated.

When it is possible to execute desired waveform equalization by combining the former stage and latter stage FIR filters 51A and 51B, then in the electric power supply control section 53, a comparison is made between the respective tap coefficients CB0 to CBk of the latter stage FIR filter 51B and a previously determined threshold Cth, and a tap coefficient CBj for which the absolute value is less than the threshold Cth is determined, and electric power control signals SBi and SBq for stopping the electric power supply to the circuit part that corresponds to the tap coefficient CBj are generated and output to the latter stage FIR filter 51B (S39). In the latter stage FIR filter 51B that has received the electric power control signals from the electric power supply control section 53, electric power supply to the complex multiplication circuit and the like that correspond to the tap coefficient CBj is stopped (S40). The abovementioned series of processing from S36 to S40 is executed continually during operation, or repeatedly at a predetermined period.

By performing adaptive waveform equalization using the FIR filters 51A and 51B of the two stage configuration as described above, it is possible to make the waveform of the reception signal approach the ideal at a higher accuracy, and since the electric power supply to the unnecessary circuit parts of the respective stage FIR filters that correspond to the values of each of the tap coefficients CA0 to CAk and CB0 to CBk is stopped, then an increase in power consumption due to the FIR filter being a two stage configuration can be suppressed.

Next is a description of a second embodiment of an optical receiver.

In the abovementioned first embodiment and its application example, waveform equalization was performed using the FIR filter with time segment processing. On the other hand, in the second embodiment, a configuration example that performs processing of the waveform equalization for a frequency domain is described.

Figure 10:
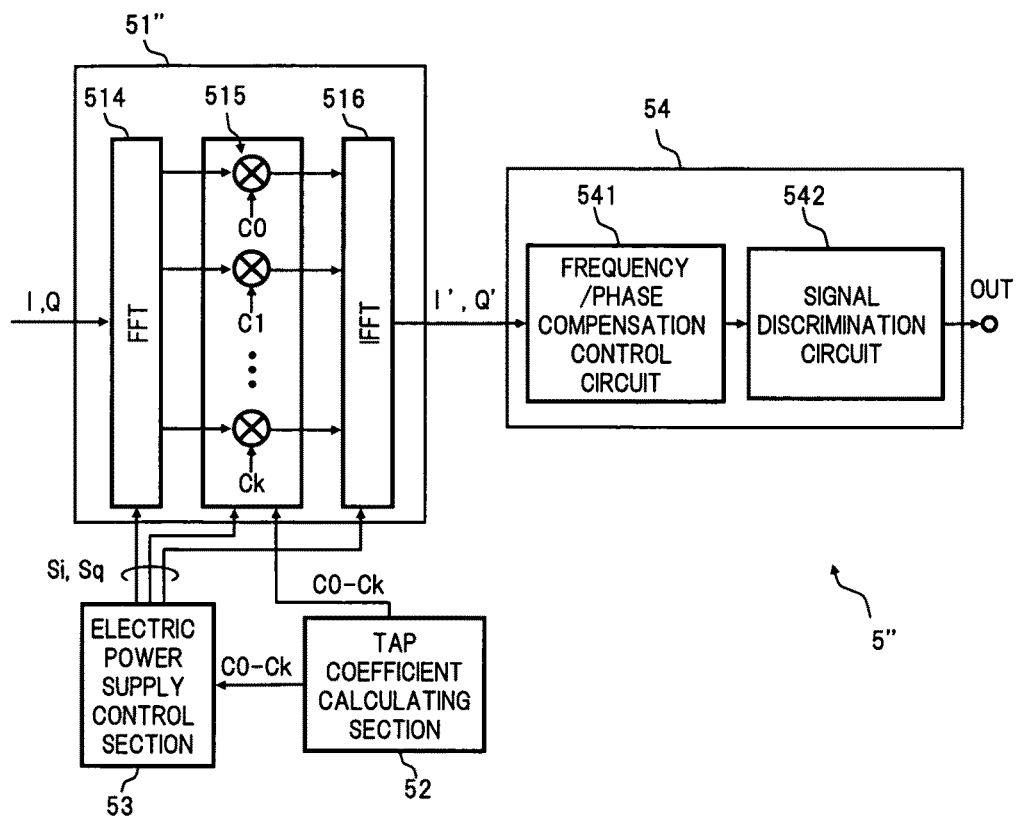
FIG. 10 is a block diagram illustrating a configuration of a digital signal processing circuit applicable to an optical receiver of a second embodiment.

FIG. 10 is block diagram illustrating a configuration of a digital signal processing circuit applicable to the optical receiver of the second embodiment. The overall configuration of the optical receiver in the second embodiment is similar to the configuration of the aforementioned first embodiment (FIG. 1). The digital signal processing circuit 5'' illustrated in FIG. 10 has a waveform equalization section 51'' that uses fast Fourier transform (FFT) and inverse fast Fourier transform (IFFT) to perform filtering in a frequency domain.

This waveform equalization section 51'' provides reception signals I and Q from the AD converters 31 and 32, to a FFT circuit 514 to perform fast Fourier transform. The respective frequency components output from the FFT circuit 514 are respectively provided to paralleley arranged complex multiplication circuits 515. The complex multiplication circuits 515 multiply the respective frequency component that have been fast Fourier transformed in the FFT circuit 514 by tap coefficients Ci (i=0 to k) calculated in the tap coefficient calculating section 52, and output these to an IFFT circuit 516. The IFFT circuit 516 inverse Fourier transforms the frequency components output from the complex multiplication circuits 515 and outputs these. As a result, signals I' and Q' that have been waveform equalized by frequency domain processing are delivered from the waveform equalization section 51'' to the discrimination processing section 54.

Here one example of a method of calculating the tap coefficients of the abovementioned waveform equalization section 51'' that uses the FFT/IFFT is given. In the case where a transfer function H(ω) of the signal light for when this is L(m) propagated by an optical fiber having a chromatic dispersion value $\beta_2$ (s²/m) is expressed by the aforementioned equation (1), and a transfer function $H^{-1}(\omega)$ of an equalization filter for compensating the chromatic dispersion of the signal light is expressed by the aforementioned equation (2), the tap coefficient Ck provided to the waveform equalization section 51'' can be calculated according to the following equation (4), with the tap number as N, and the sampling frequency as f.

$$Ck = \exp\left(j\left(\frac{-N/2+k}{N}\right)^2 (2\pi f)^2 \beta_2 L/2\right) \quad (4)$$

Also in the above digital signal processing circuit 5'', similar to the case of the aforementioned first embodiment, before starting operation of the signal light, the value of the tap coefficients C0 to Ck of the waveform equalization section 51'' that correspond to the dispersion compensation amount provided to the optical receiver, is calculated in the tap coefficient calculating section 52. Then, a comparison is made in the electric power supply control section 53 between the tap coefficients C0 to Ck and a previously determined threshold Cth, and electric power control signals Si and Sq for stopping electric power supply to the circuit part that corresponds to the tap coefficient Cj for which the absolute value is less than the threshold Cth are generated, and these electric power control signals Si and Sq are output to the waveform equalization section 51". In the waveform equalization section 51" that receives the electric power control signals Si and Sq from the electric power supply control section 53, electric power supply to the complex multiplication circuit 515 corresponding to the tap coefficient Cj is stopped, or electric power supply to the circuit element corresponding to the tap coefficient Cj in the FFT circuit 514 or the IFFT circuit 516 is stopped.

Consequently, also in the second embodiment that performs waveform equalization by frequency domain processing using the FFT/IFFT, a similar effect to the aforementioned case of the first embodiment that performs waveform equalization by time domain processing using the FIR filter is possible. That is, it is possible to reduce the power consumption of the optical receiver, while realizing excellent reception performance due to effective dispersion compensation.

In the above second embodiment, the case where adaptive waveform equalization is not applied has been described. However similarly to the aforementioned first and second application examples of the first embodiment, it is also possible to apply adaptive waveform equalization to the waveform equalization section 51" that uses the FFT/IFFT.

Next is a description of a third embodiment of an optical receiver.

Figure 11:
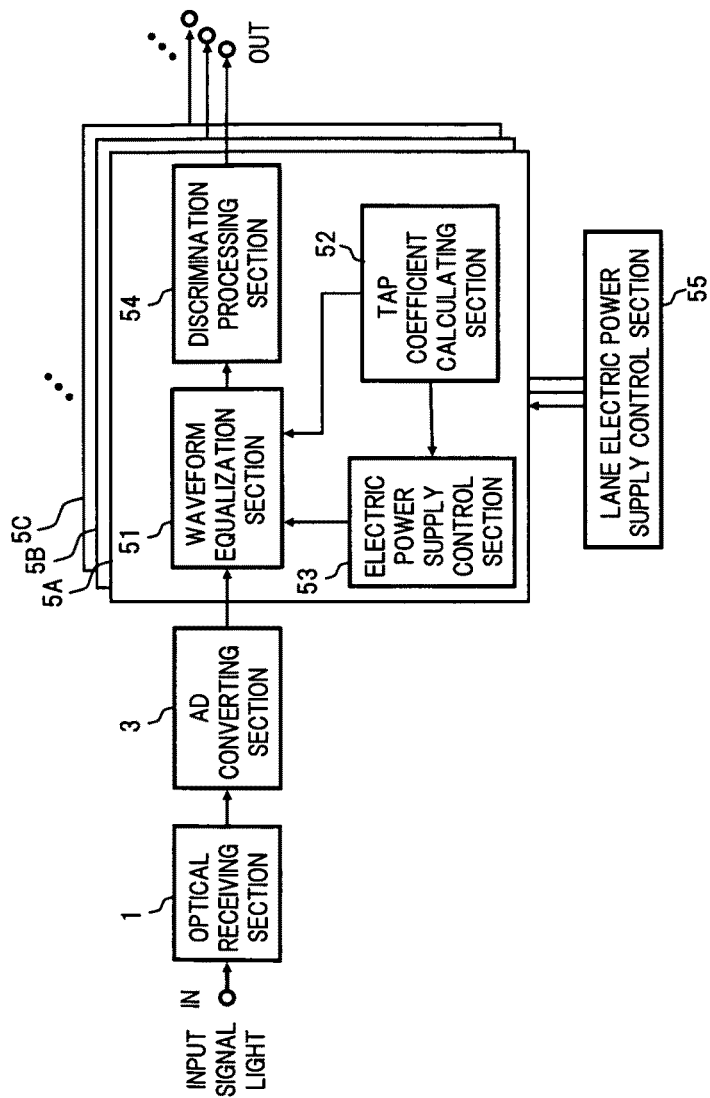
FIG. 11 is a block diagram illustrating a configuration of an optical receiver of a third embodiment.

FIG. 11 is a block diagram illustrating a configuration of an optical receiver of the third embodiment. Here an example where the invention is applied to an optical receiver that reception processes signal light with different symbol rates or bit rates is illustrated.

In FIG. 11, the optical receiver of this embodiment includes an optical receiving section 1 and an AD conversion section 3 similar to the abovementioned first embodiment, and has digital signal processing circuits 5A, 5B, 5C, . . . separated in a plurality of lanes, and reception processes the digital signals output from the AD conversion section 3 using a digital signal processing circuit of a lane number selected corresponding to the symbol rate or the bit rate thereof. The digital signal processing circuits 5A, 5B, 5C, . . . of the respective lanes have a configuration similar to the aforementioned digital signal processing circuit 5 of the first embodiment. Here a lane electric power supply control section 55 is provided that centralizes and controls the electric power supply to each of the digital signal processing circuits 5A, 5B, 5C . . . .

In the optical receiver of the above configuration, when receiving a signal light of for example 40 Gbit/s, a 128 lane digital signal processing circuit is selected and used, while when receiving a signal light of 10 Gbits, a 32 lane digital signal processing circuit is selected and used, and signal processing for waveform equalization or signal discrimination and the like is performed. At this time, the lane electric power supply control section 55 determines a non-selection lane which is not being used, and generates an electric power control signal for stopping electric power supply to the digital signal processing circuit corresponding to this. According to this electric power control signal, supply of electric power or a clock signal to the digital signal processing circuit for the non-selection lane is stopped. For the digital signal processing circuit of the lane that is used, electric power supply control is performed corresponding to the value of the tap coefficient of the waveform equalization section, similarly to the abovementioned respective embodiments or their application examples.

In the above manner, according to the optical receiver of the present embodiment, when reception processing signal light with different symbol rates or bit rates, by controlling the electric power supply to the respective digital signal control circuits corresponding to the status of use of the digital signal processing circuits that are separated into a plurality of lanes, it is possible to efficiently reduce the power consumption of the optical receiver, according to the symbol rate or the bit rate of the reception signal.

Next is a description of a fourth embodiment of an optical receiver.

Figure 12:
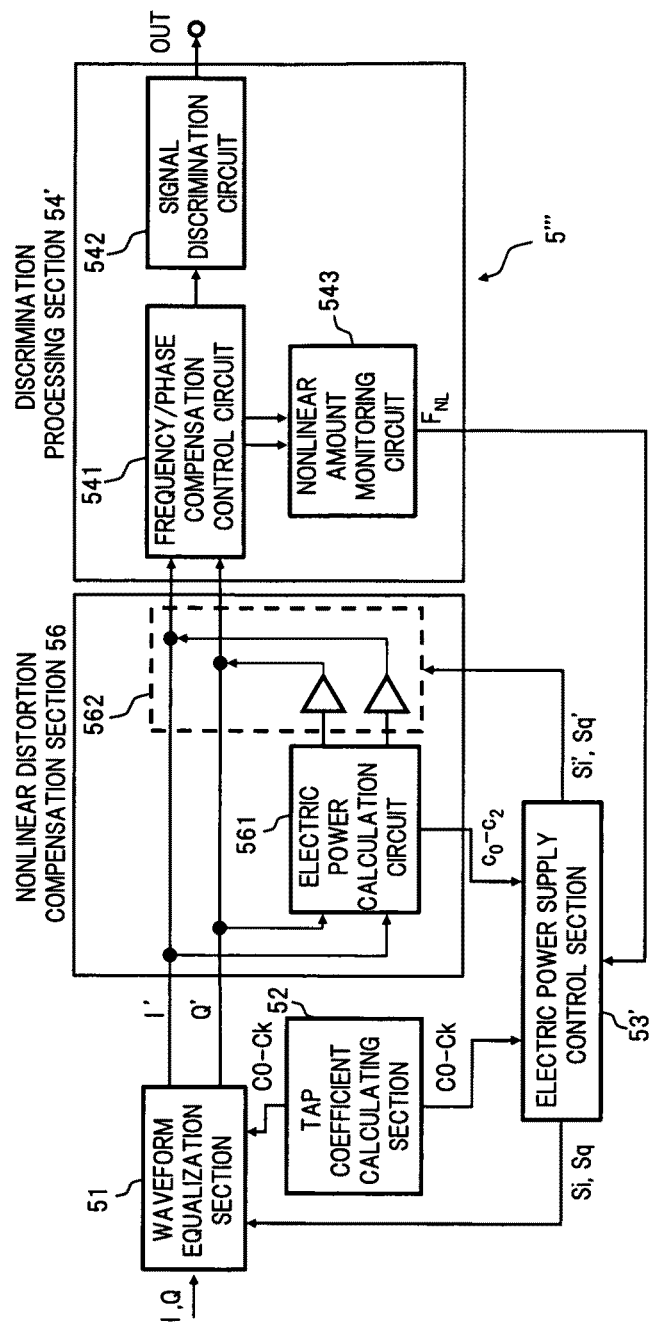
FIG. 12 is a block diagram illustrating a configuration of a digital signal processing circuit applicable to an optical receiver of a fourth embodiment.

FIG. 12 is block diagram illustrating a configuration of a digital signal processing circuit in the optical receiver of the fourth embodiment. Here, an application example is illustrated that also deals with nonlinear distortion compensation in addition to dispersion compensation. The overall configuration of the optical receiver in the fourth embodiment is similar to the configuration of the aforementioned first embodiment.

The digital signal processing circuit 5''' illustrated in FIG. 12 is configured with a nonlinear distortion compensation section 56 added to a latter stage of a waveform equalization section 51, and electric power supply to the waveform equalization section 51 and the nonlinear distortion compensation section 56 is controlled by an electric power supply control section 53'. Furthermore, here a nonlinear amount monitoring circuit 543 that monitors the nonlinear amount of the reception signal is provided inside a discrimination processing section 54'.

Figure 13:
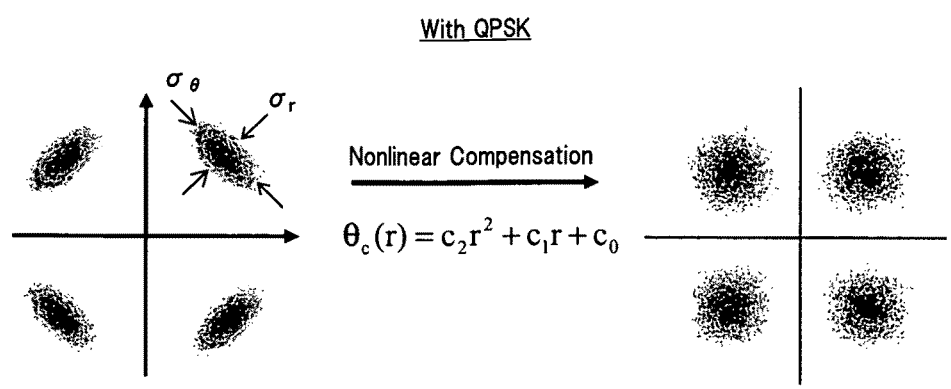
FIG. 13 is a diagram for describing nonlinear distortion compensation in the fourth embodiment.

The nonlinear distortion compensation section 56, when the modulation format for the received signal light is QPSK corresponding to $m=2^2$, the reception signal in which nonlinear distortion is produced as illustrated on the left side of FIG. 13, is processed according to a previously determined algorithm, to thereby convert this into a distortion compensated signal as illustrated on the right side of FIG. 13. As a specific example for this nonlinear distortion compensation section 56, it is possible to apply a configuration comprising an electric power calculation circuit 561 to which is input a part of signals I' and Q' output from the waveform equalization section 51, and a phase modulation circuit 562 that subjects the output signals I' and Q' from the waveform equalization section 51 to phase modulation, based on the calculation result of the electric power calculation circuit 561. In regards to the details of the nonlinear distortion compensation, these are specifically disclosed for example in Document 1: A. P. T. Lau and J. M. Kahn, "Signal Design and Detection in Presence of Nonlinear Phase Noise", Journal of Lightwave Technology, Vol. 25, No. 10, October 2007, and Document 2: K. Kikuchi, "Electronic Post-compensation for Nonlinear Phase Fluctuations in a 1000-km 20-Gbits Optical Quadrature Phase-shift Keying Transmission System Using the Digital Coherent Receiver", Optics Express, Vol. 16, No. 2, January 2008.

The electric power supply control section 53' performs a comparison between a coefficient $c_i(i=0, 1, 2)$ obtained in an operation for calculation processing in accordance with an algorithm in the nonlinear distortion compensation section 56, and a previously determined threshold $c_{th}$, and determines a coefficient $c_j$ for which the absolute value is less than the threshold $c_{th}$, and generates electric power control signals Si' and Sq' for stopping electric power supply to the circuit part that corresponds to the coefficient $c_j$ inside the nonlinear distortion compensation section 56. Furthermore, instead of the abovementioned coefficient $c_i$, a nonlinear amount $F_{NL}$ that is monitored by a later mentioned nonlinear amount monitoring circuit 543 is used, and when the nonlinear amount $F_{NL}$ is less than a previously set threshold $F_{th}$, electric power control signals Si' and Sq' for stopping electric power supply to unnecessary circuit parts inside the nonlinear distortion compensation section 56 are generated. The electric power supply control section 53', similarly to the case of the abovementioned first embodiment, also performs electric power supply control for the waveform equalization section 51 that performs dispersion compensation.

The nonlinear amount monitoring circuit 543 takes out a signal after phase synchronization for example from the frequency/phase compensation control circuit 541, and monitors the generation amount of nonlinear distortion based on this signal. Specifically, when the signal after phase synchronization is $S_k = I_k + jQ_k$ (k=1, 2, to N; where N is an arbitrary integer), the mean amplitude r and the mean phase θ of the reception signal are expressed by the following equation (5) and equation (6).

$$r = \frac{1}{N}\sum_{k=1}^{N}\sqrt{(I_k^2 + Q_k^2)} \quad (5)$$

$$\theta = \frac{1}{N}\sum_{k=1}^{N}\tan^{-1}\left(\frac{Q_k}{I_k}\right) \quad (6)$$

Furthermore, the standard deviation $\sigma_r$ in the amplitude direction, and the standard deviation $\sigma_\theta$ in the phase direction, are expressed by the following equation (7) and equation (8).

$$\sigma_r = \sqrt{\frac{1}{N}\sum_{k=1}^{N}\left(\sqrt{(I_k^2 + Q_k^2)} - r\right)^2} \quad (7)$$

$$\sigma_\theta = \sqrt{\frac{1}{N}\sum_{k=1}^{N}\left(\tan^{-1}\left(\frac{Q_k}{I_k}\right) - \theta\right)^2} \quad (8)$$

The nonlinear distortion amount $F_{NL}$ monitored by the nonlinear amount monitoring circuit 543 is defined by the following equation (9) using the above standard deviation $\sigma_r$, and standard deviation $\sigma_\theta$.

$$F_{NL} = \frac{\sigma_\theta}{\sigma_r} \quad (9)$$

This nonlinear distortion amount $F_{NL}$ is transmitted to the aforementioned electric power supply control section 53', and compared with a previously determined threshold $F_{th}$, to perform electric power supply control of the nonlinear distortion compensation section 56.

According to the optical receiver of the present embodiment as described above, when nonlinear distortion compensation is also performed in addition to dispersion compensation, by controlling the electric power supply to the nonlinear distortion compensation section 56 according to the coefficient $c_i$ calculated in the nonlinear distortion compensation section 56, or the nonlinear distortion amount $F_{NL}$ monitored by the nonlinear amount monitoring circuit 543, it is possible to efficiently reduce the power consumption of the optical receiver corresponding to the generation state not only of chromatic dispersion or polarization dispersion but also of nonlinear distortion.

Figure 14:
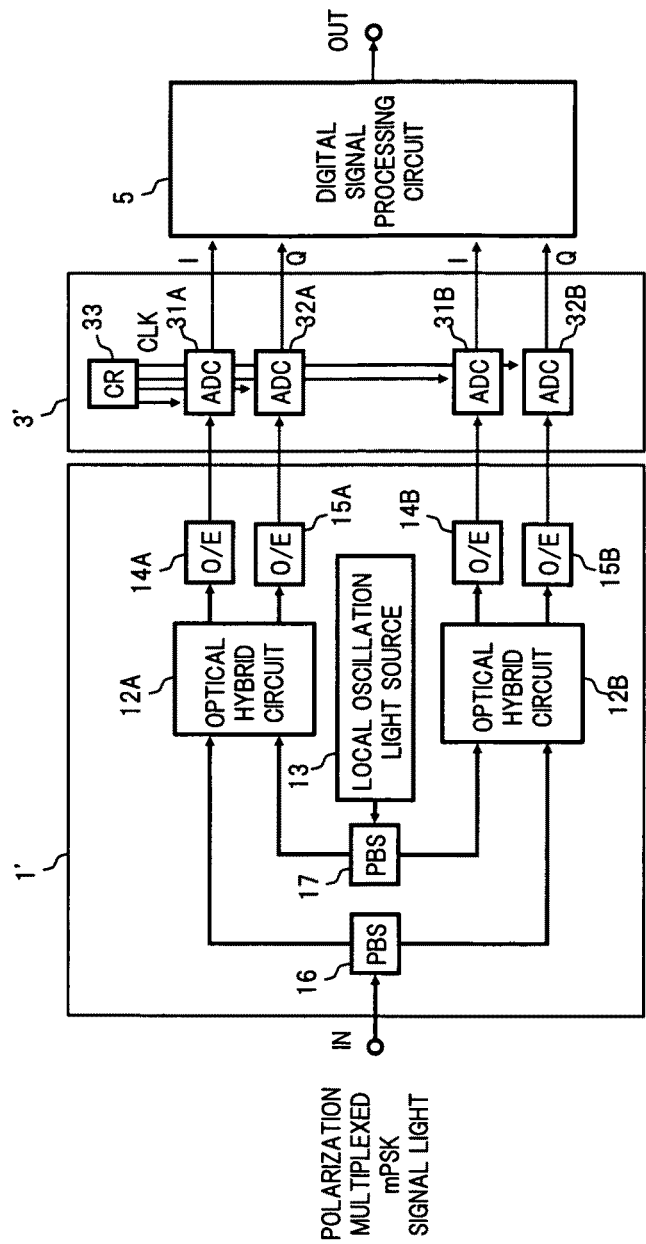
FIG. 14 is a block diagram illustrating a configuration example corresponding to a polarization multiplexing method related to the above embodiments.

In the above first through fourth embodiments, a configuration example of the optical receiver that coherently receives mPSK signal light has been described. However the invention is not limited to this, and for example as illustrated in FIG. 14, it is also possible to adapt the present invention to an optical receiver that coherently receives mPSK signal light that has been polarization multiplexed. In the configuration of FIG. 14, the polarization multiplexed mPSK signal light input to the input port IN is separated into two orthogonal polarization components with a polarization being splitter (PBS) 16, and these are respectively provided to optical hybrid circuits 12A and 12B. Furthermore, the local generated light from the local oscillation light source 13 is also separated into two polarization components by a PBS 17, and these are respectively provided to the optical hybrid circuits 12A and 12B. Then, reception processing similar to the case of the respective embodiments described above is performed for each of the respective polarization components, to reproduce data.

Figure 15:
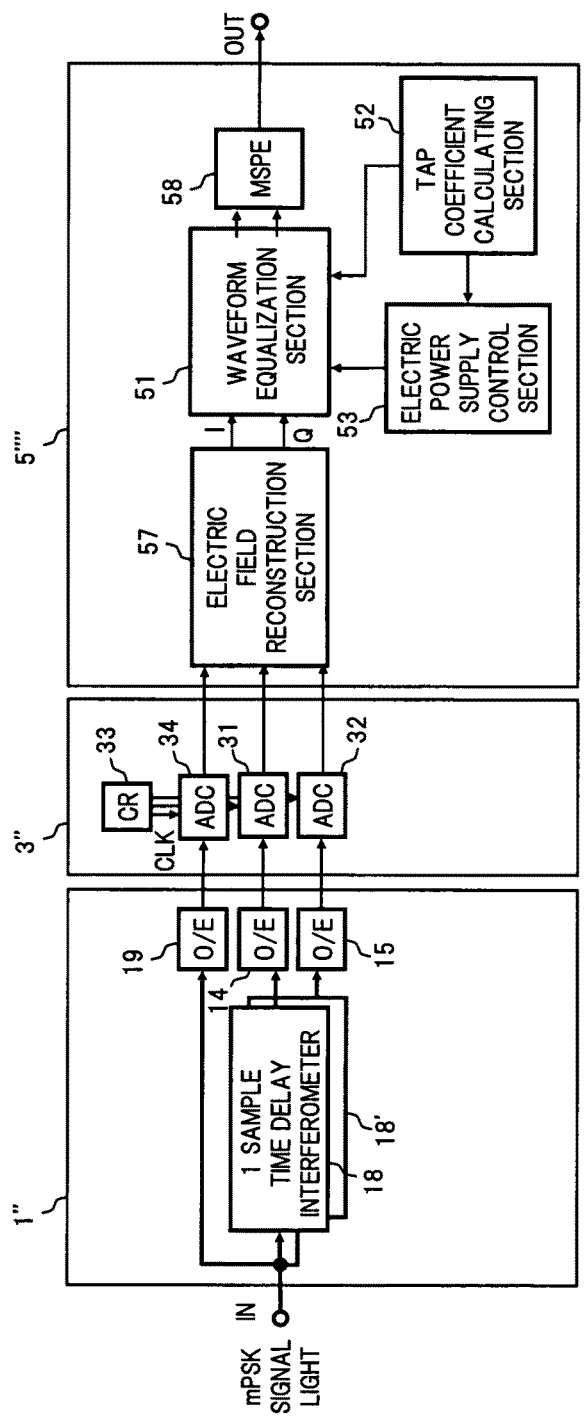
FIG. 15 is a block diagram illustrating a configuration example corresponding to a self coherent reception method, related to the above embodiments.

Furthermore, as illustrated for example in FIG. 15, it is also possible to adapt the invention to an optical receiver that reception processes single polarization mPSK signal light by a self coherent method. In the configuration of FIG. 15, the mPSK signal light input to the input port IN is branched into three, and these are respectively provided to one sample time delay interferometers 18 and 18', and to a photodetector 19. Then, electrical signals that have been photoelectrically converted in respective photodetectors 14, 15, and 19, are converted to digital signals in AD converters 31, 32, and 34, and then delivered to an electric field reconstruction section 57 of a digital signal processing circuit 5''', and the complex electric field is reconstructed. Then signals I and Q output from the electric field reconstruction section 57 are waveform equalized in a waveform equalization section 51, and processed in a multi-symbol phase estimation (MSPE) circuit 58 to thereby reproduce reception data. In regards to the details of the self coherent reception method, these are specifically disclosed for example in Document 3: Xiang Liu, "Generalized data-aided multi-symbol phase estimation for improving receiver sensitivity in direct-detection optical m-ary DPSK", Optics Express, Vol. 15, No. 6, March 2007.

Figure 16:
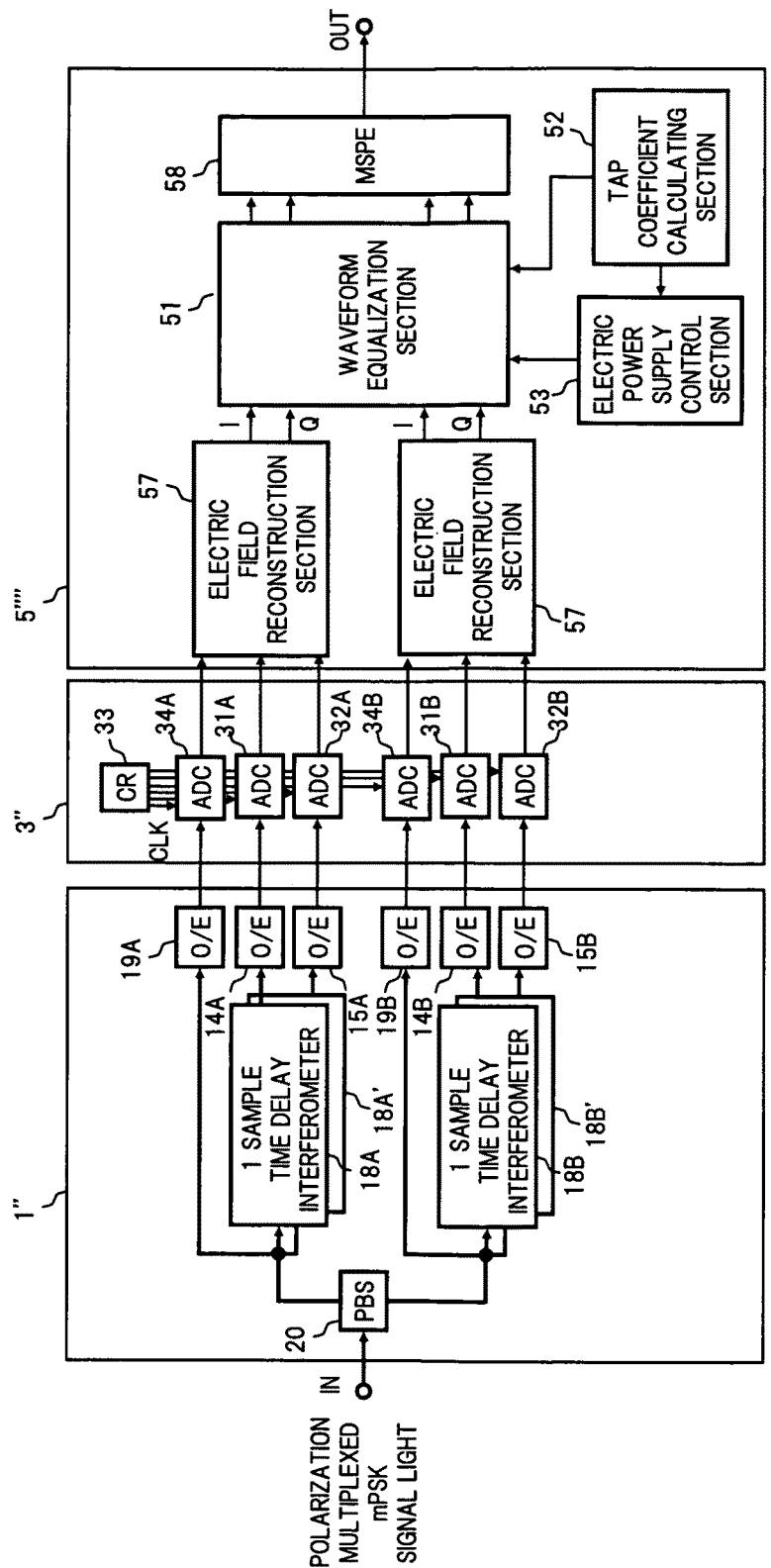
FIG. 16 is a block diagram illustrating a configuration example corresponding to a polarization multiplexing method in FIG. 15.

Furthermore, for the optical receiver of the above self coherent type, it is also possible for this to correspond to a polarization multiplexing method similar to the aforementioned case illustrated in FIG. 14. A configuration example of an optical receiver that receives polarization multiplexed mPSK signal light by the self coherent method is illustrated in FIG. 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method for electric power supply control to control a supply state of electric power to an optical receiver, the optical receiver receiving signal light propagated in an optical fiber transmission line, converting the signal light into a digital electrical signal, and processing the obtained reception signal, to thereby reproduce data, when a digital signal processing is performed in the optical receiver, the method comprising:

calculating a variable parameter used in waveform equalization of a reception signal, based on a state of the optical fiber transmission line;

determining a variable parameter among calculated variable parameters, for which an absolute value is less than a previously determined threshold; and generating, for a circuit that performs waveform equalization of the reception signal, an electric power control signal for stopping electric power supply to a circuit part that corresponds to the determined variable parameter, wherein the performing of the waveform equalization is performed by a waveform equalizing circuit having a first filter and a second filter that are connected in series, and wherein the calculating calculates for each component of the reception signal, before starting a signal light operation, at least one variable parameter used in the first filter, corresponding to a dispersion compensation amount that has been determined in accordance with dispersion characteristics of the optical fiber transmission line, and after starting the signal light operation, the calculating monitors a waveform of the reception signal that has been waveform equalized by the waveform equalization circuit, and adaptively recalculates for each component of the reception signal, at least one variable parameter used in the second filter, so that the monitored waveform approaches an ideal waveform, and wherein, in response to an insufficiency of the number of the variable parameters used in the second filter for the waveform to approach the ideal waveform under the adaptive recalculation, the calculating recalculates the variable parameter used in the first filter so that the insufficiency is covered by additionally using the variable parameter used in the first filter.

2. A method for electric power supply control according to claim 1, wherein when the waveform equalization of the reception signal is performed by separating the reception signal into a plurality of components that are different to each other, and multiplying each of the respective components by a variable parameter and attaching a weighting, the calculating calculates for each component of the reception signal, before starting the signal light operation a variable parameter used in the waveform equalization, corresponding to a dispersion compensation amount that has been determined in accordance with dispersion characteristics of the optical fiber transmission line, and the generating generates, for the waveform equalization circuit, an electric power control signal to stop electric power supply to a circuit corresponding to the component of the reception signal that has been multiplied by the determined variable parameter.

3. A method for electric power supply control according to claim 2, wherein the calculating calculates for each component of the reception signal, a variable parameter that is used in waveform equalization performed by separating the reception signal into a plurality of components that are different to each other in a time domain.

4. A method for electric power supply control according to claim 2, wherein the calculating calculates for each component of the reception signal, a variable parameter that is used in waveform equalization performed by separating the reception signal into a plurality of components that are different to each other in a frequency domain.

5. A method for electric power supply control according to claim 1, wherein the generating generates, for the waveform equalization circuit an electric power control signal for stopping a clock signal that is supplied to a circuit part that corresponds to the determined variable parameter.

6. A method for electric power supply control according to claim 1, wherein a digital signal processing that is performed by the optical receiver includes an operation for separating the reception signal for which waveform equalization has been performed, into a plurality of components that are different to each other, and attaching a weighting to each of the variable parameters with respect to the components, to thereby compensate for nonlinear distortion produced in the reception signal, and the determining determines, among the variable parameters used in the compensation of the nonlinear distortion, a variable parameter for which the absolute value is less than a previously determined threshold, and the generating generates, for a circuit that performs correction of the nonlinear distortion, an electric power control signal to stop electric power supply to a circuit corresponding to the component of the reception signal that has been multiplied by the determined variable parameter.

7. A digital signal processing circuit that is used in an optical receiver that receives signal light propagated in an optical fiber transmission line, converts the signal light into a digital electrical signal and processes an obtained reception signal, to thereby reproduce data, the digital signal processing circuit comprising:

a waveform equalization device configured to perform waveform equalization on the reception signal;

a variable parameter calculating device configured to calculate a variable parameter used in the waveform equalization device, based on a state of the optical fiber transmission line;

a variable parameter determining device configured, among the variable parameters calculated by the variable parameter calculating device, to determine a variable parameter for which an absolute value is less than a previously determined threshold;

an electric power control signal generating device configured, for the waveform equalization device, to generate an electric power control signal for stopping electric power supply to a circuit part that corresponds to a variable parameter that has been determined by the variable parameter determining device; and a discrimination processing device configured to discriminate a reception signal that has been waveform equalized by the waveform equalization device to reproduce data, wherein the waveform equalization device has a first filter and a second filter that are connected in series and wherein the variable parameter calculating device is configured to calculate for each component of the reception signal, before starting a signal light operation, at least one variable parameter used in the first filter, corresponding to a dispersion compensation amount that has been determined in accordance with dispersion characteristics of the optical fiber transmission line, and after starting the signal light operation, the variable parameter calculating device is configured to monitor a waveform of the reception signal that has been waveform equalized by the waveform equalization device, and adaptively recalculate for each component of the reception signal, at least one variable parameter used in the second filter, so that the monitored waveform approaches an ideal waveform, and wherein the variable parameter calculating device is configured to recalculate, when the number of the variable parameters used in the second filter is insufficient for the waveform to approach the ideal waveform under the adaptive recalculation, the variable parameter used in the first filter so that the insufficiency is covered by additionally using the variable parameter used in the first filter.

8. A digital signal processing circuit according to claim 7, wherein the waveform equalization device is configured to perform waveform equalization of the reception signal by separating the reception signal into a plurality of components that are different to each other, and multiplying each of the respective components by a variable parameter and attaching a weighting, the variable parameter calculating device is configured, before starting the signal light operation, to calculate for each of the components of the reception signal, a variable parameter used in the waveform equalization, corresponding to a dispersion the compensation amount that has been determined in accordance with the dispersion characteristics of the optical fiber transmission line, and the electric power control signal generating device is configured, for the waveform equalization device, to generate an electric power control signal for stopping electric power supply to a circuit part that corresponds to the component of the reception signal that has been multiplied by the variable parameter determined by the variable parameter determining device.

9. A digital signal processing circuit according to claim 8, wherein the waveform equalization device is configured to perform waveform equalization by separating the reception signal into a plurality of components that are different to each other in a time domain.

10. A digital signal processing circuit according to claim 9, wherein the waveform equalization device is configured to perform waveform equalization of the reception signal using a finite impulse response (FIR) filter that has; a delay circuit that delays the reception signal for only a predetermined time, a plurality of multiplication circuits that tap components with different times that have been delayed by the delay circuit, and multiply the tapped components by a variable parameter, and an adding circuit that takes a sum total of output components from the respective multiplication circuits, and the electric power control signal generating device is configured to generate an electric power control signal for stopping electric power supply to a multiplication circuit that is provided with a variable parameter that has been determined by the variable parameter determining device, or to stop electric power supply to a circuit element corresponding to the variable parameter in the adding circuit.

11. A digital signal processing circuit according to claim 8, wherein the waveform equalization device is configured to perform waveform equalization by separating the reception signal into a plurality of components that are different to each other in a frequency domain.

12. A digital signal processing circuit according to claim 11, wherein the waveform equalization device has a fast Fourier transform (FFT) circuit provided with the reception signal, a plurality of multiplication circuits that multiply components with different frequencies output from the fast Fourier transform circuit, by the variable parameter, and an inverse fast Fourier transform (IFFT) circuit provided with an output component from the respective multiplication circuits, and the electric power control signal generating device is configured to generate an electric power control signal for stopping electric power supply to a multiplication circuit that is provided with a variable parameter that has been determined by the variable parameter determining device, or to stop electric power supply to a circuit element corresponding to the variable parameter in the fast Fourier transform circuit or the inverse fast Fourier transform circuit.

13. A digital signal processing circuit according to claim 7, wherein the electric power control signal generating device is configured, for the waveform equalization device, to generate an electric power control signal for stopping a clock signal supplied to a circuit part that corresponds to a variable parameter that has been determined by the variable parameter determining device.

14. A digital signal processing circuit according to claim 7, comprising a nonlinear distortion compensation device configured to receive a reception signal that has been waveform equalized by the waveform equalization device, and separate the reception signal into a plurality of components that are different to each other, and multiply each of the respective components by a variable parameter to attach a weighting, to thereby compensate nonlinear distortion produced in the reception signal, and the variable parameter determining device is configured, among the variable parameters used in the nonlinear distortion compensation device, to determine a variable parameter for which an absolute value is less than a previously determined threshold, and the electric power control signal generating device is configured, for the nonlinear distortion compensation device, to generate an electric power control signal for stopping electric power supply to a circuit part that corresponds to the component that has been multiplied by the variable parameter determined by the variable parameter determining device.

15. A digital signal processing circuit accordingly to claim 14, comprising a nonlinear distortion amount monitoring device configured to monitor a nonlinear distortion amount of a reception signal that has been processed by the nonlinear distortion compensation device.

16. An optical receiver that receives signal light propagated in an optical fiber transmission line and processes the reception signal to thereby reproduce data, comprising:

an optical receiving section configured to receive the signal light and convert this into an electrical signal;

an AD conversion section configured to convert an electrical signal converted by the optical receiving section, into a digital reception signal; and a digital signal processing circuit accordingly to claim 8 that performs digital signal processing of the reception signal that has been converted in the AD conversion section.

17. An optical receiver according to claim 16, wherein
the optical receiving section is configured to use local oscillation light, and coherently receive the signal light, and convert the reception light into an electrical signal.

18. An optical receiver accordingly to claim 16, wherein
the optical receiving section is configured to use a delay interferometer, and self coherently receive the signal light, and convert the reception light into an electrical signal.

19. An optical receiver according to claim 16, wherein
the optical receiving section is configured to separate the signal light that has been polarization multiplexed, into two orthogonal polarization components, and receive this.

20. An optical receiver according to claim 16, wherein
when signal light with different symbol rates or bit rates is input to the optical receiver,
there is provided a plurality of the digital signal processing circuits connected in a plurality of separate lanes, to an output of the AD conversion section,
and the AD conversion section only outputs a converted reception signal to a lane selected among the plurality of lanes corresponding to the symbol rate or the bit rate,
and furthermore,
there is provided a lane electric power supply control device that generates an electric power control signal for stopping electric power supply to a digital signal processing circuit that is connected to a non selected lane.

* * * * *

UNITED STATES PATENT AND TRADEMARK OFFICE
CERTIFICATE OF CORRECTION

| | |
|---|---|
| PATENT NO. | : 8,744,278 B2 |
| APPLICATION NO. | : 12/458104 |
| DATED | : June 3, 2014 |
| INVENTOR(S) | : Oda et al. |

Page 1 of 1

It is certified that error appears in the above-identified patent and that said Letters Patent is hereby corrected as shown below:

In the Claims

Column 18, Line 10, In Claim 6, after "includes" delete "an operation for".
Column 20, Line 50, In Claim 15, delete "accordingly" and insert -- according --, therefor.
Column 20, Line 64, In Claim 16, delete "accordingly to claim 8" and insert -- according to claim 7 --, therefor.
Column 21, Line 5, In Claim 18, delete "accordingly" and insert -- according --, therefor.

Signed and Sealed this
Twenty-third Day of September, 2014

Michelle K. Lee
*Deputy Director of the United States Patent and Trademark Office*